United States Patent
Chang

[11] Patent Number: 6,073,531
[45] Date of Patent: Jun. 13, 2000

[54] SAW BLADE ADJUSTING DEVICE OF A BAND SAWING MACHINE

[76] Inventor: Chin-Chin Chang, No. 122, Lane 967, San Feng Road, Feng Yuan, Taichung Hsien, Taiwan

[21] Appl. No.: 09/213,511

[22] Filed: Dec. 17, 1998

[51] Int. Cl.[7] .............................. B23D 55/10; B26D 1/48
[52] U.S. Cl. ................................................ 83/818; 83/816
[58] Field of Search .............................. 83/814, 816, 817, 83/818, 819; 30/380, 513; 474/101, 113, 117, 136

[56] References Cited

U.S. PATENT DOCUMENTS

| | | | |
|---|---|---|---|
| 2,380,700 | 7/1945 | Lasar | 83/817 X |
| 2,492,824 | 12/1949 | Ahrndt et al. | 83/818 X |
| 2,884,026 | 4/1959 | Krenzke | 83/818 |
| 2,969,815 | 1/1961 | Lasar | 83/818 |
| 3,733,952 | 5/1973 | Fukugami et al. | 83/818 X |
| 3,889,567 | 6/1975 | Sato et al. | 83/818 |
| 4,311,074 | 1/1982 | Titus | 83/816 |
| 4,364,294 | 12/1982 | Eccardt | 83/816 X |
| 4,386,545 | 6/1983 | Chaconas | 83/817 |
| 4,576,077 | 3/1986 | Titus | 83/816 |

*Primary Examiner*—Clark F. Dexter
*Attorney, Agent, or Firm*—Connolly Bove Lodge & Hutz LLP

[57] ABSTRACT

A saw blade adjusting device of a band sawing machine includes an urging seat, an urging knob, an adjusting knob, a sliding seat, and a wheel frame. The urging seat has projections and depressions at a top end thereof, and the urging knob has urging portions projecting from a bottom side of an inner top end thereof, whereby the rotary adjusting motion of the urging knob is translated into an axial reciprocating urging motion. The relative abutment and separation of the urging knob and the urging seat is utilized to achieve tightening and positioning of a saw blade so that the tension of the saw blade and the distance between upper and lower wheel frames during violent cutting operation can be maintained stably to enhance the quality and efficiency of the cutting operation.

1 Claim, 6 Drawing Sheets

SAW BLADE ADJUSTING DEVICE OF A BAND SAWING MACHINE

BACKGROUND OF THE INVENTION (a) Field of the Invention

The present invention relates generally to a saw blade adjusting device of a band sawing machine, more particularly to a saw blade adjusting device in which the rotary motion of an urging knob is translated into an axial urging motion to cause abutment or separation of the urging knob and an urging seat to thereby facilitate adjustment and replacement of the saw blade and maintain the distance between upper and lower wheel frames of the band sawing machine.

(b) Description of the Prior Art

Band sawing machines are widely used in cutting operations because they are easy to operate. FIG. 1 shows a saw blade adjusting structure of a conventional band sawing machine. As shown, a screw rod 2 is rotated to cause a saw blade wheel 3 to displace to allow adjustment of the distance between upward and downward displacement thereof, whereby mounting or disengagement of a saw blade 4, as well as adjustment of the tautness of the saw blade 4 can be achieved. If the tautness of the saw blade 4 is not sufficient, the cutting operation cannot proceed properly. Conversely, if the saw blade 4 is excessively taut, it may easily break. As the conventional saw blade adjusting structure only utilizes a spring 5 to fit onto the screw rod 2, without any linking-up elements to achieve urging and tightening effects, it may easily become loosened during violent cutting operation of the band sawing machine. Violent vibration may cause the distance between upper and lower wheel frames 3 and the tautness of the saw blade 4 to alter, which will severely affect the cutting efficiency of the machine. Improvements thereon are therefore necessary.

SUMMARY OF THE INVENTION

A primary object of the present invention is to provide a saw blade adjusting device of a band sawing machine which allows convenient replacement of saw blades; which has tightening and positioning effects; and which can maintain the distance between upper and lower wheel frames during violent cutting operation.

Accordingly, a preferred embodiment of the saw blade adjusting device of the present invention includes an urging seat, an urging knob, an adjusting knob, a sliding seat, and a wheel frame. The urging seat has projections and depressions at a top end thereof, and the urging knob has urging portions projecting from a bottom side of an inner top end thereof, whereby the rotary adjusting motion of the urging knob is translated into an axial reciprocating urging motion. The relative abutment and separation of the urging knob and the urging seat is utilized to achieve tightening and positioning of a saw blade so that the tension of the saw blade and the distance between upper and lower wheel frames during violent cutting operation can be maintained stably to enhance the quality and efficiency of the cutting operation.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
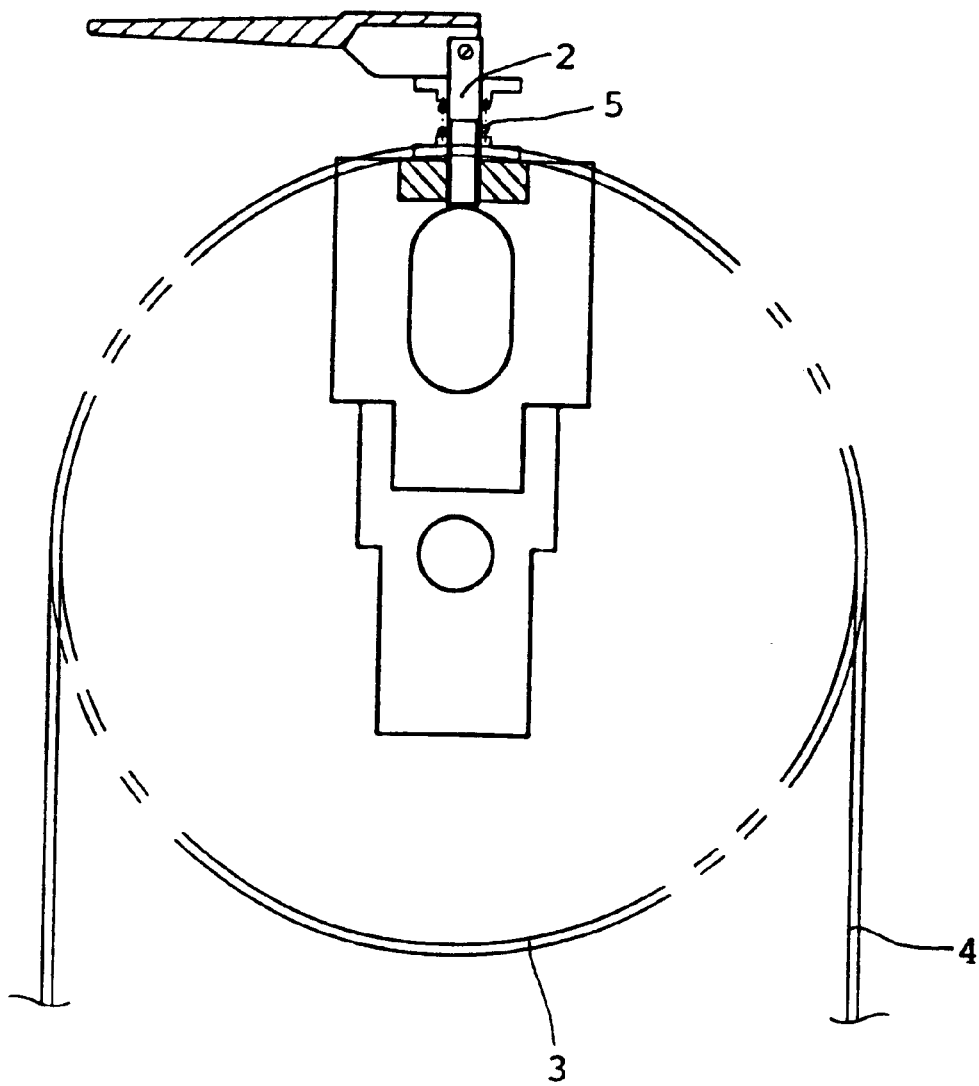
FIG. 1 is a plan schematic view of a saw blade adjusting structure of a conventional band sawing machine.
Figure 2:
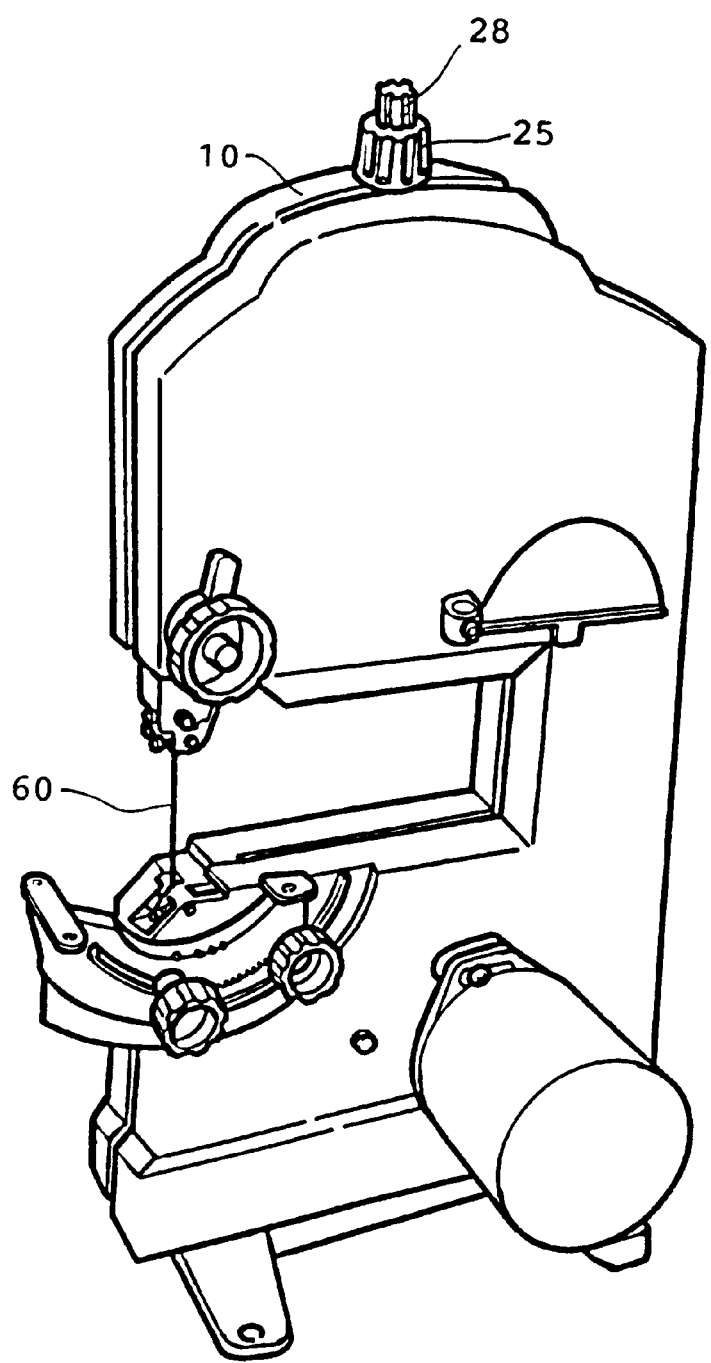
FIG. 2 is a perspective schematic view of a band sawing machine of the present invention.
Figure 3:
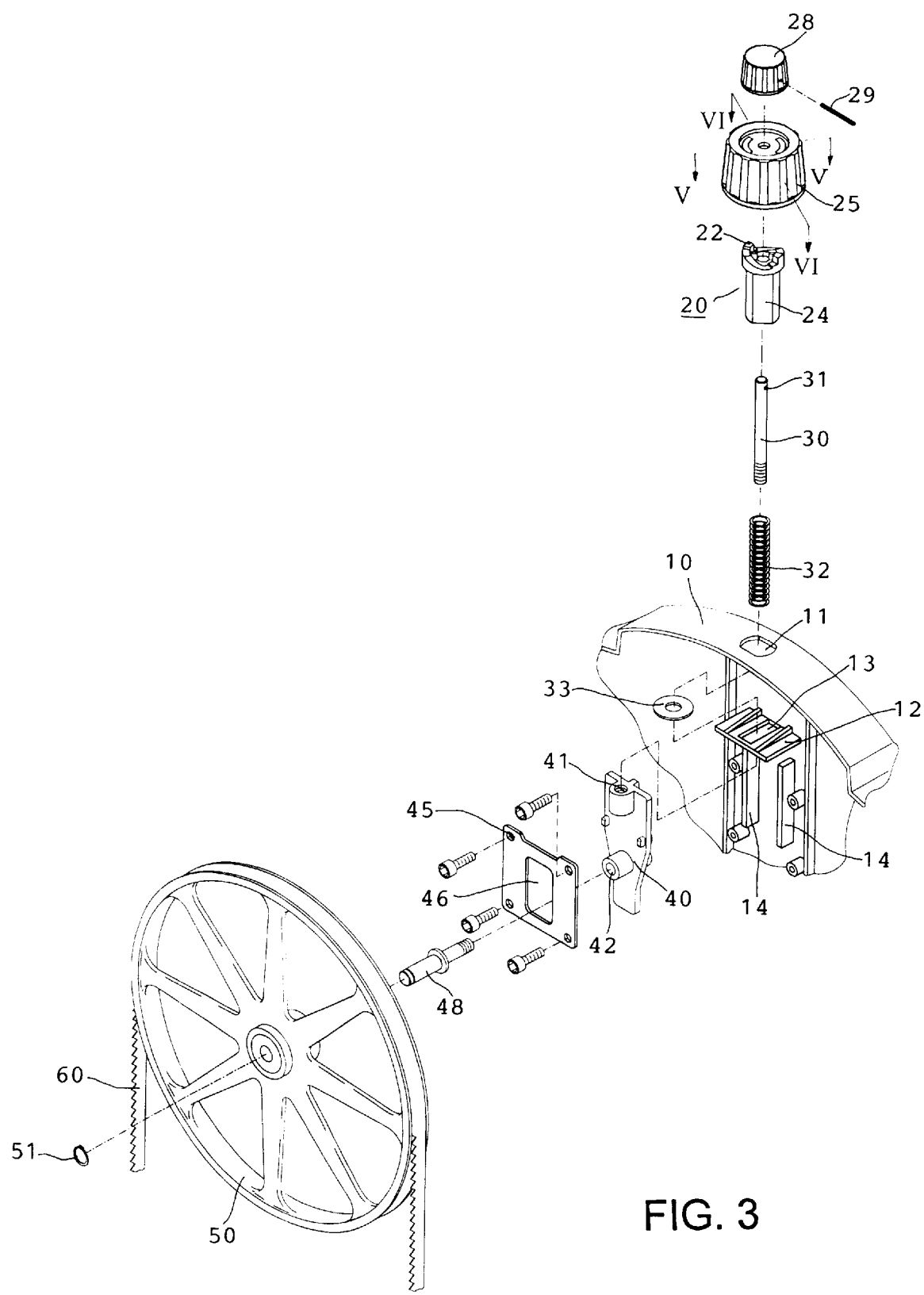
FIG. 3 is a perspective exploded view of a saw blade adjusting device of the band sawing machine of the present invention.
Figure 4:
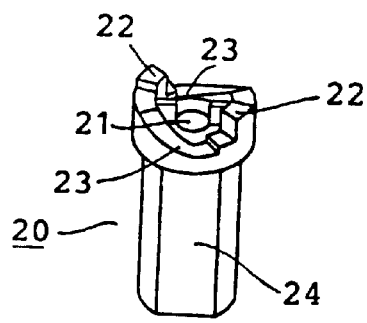
FIG. 4 is an enlarged perspective view of an urging seat shown in FIG. 3.
Figure 5:
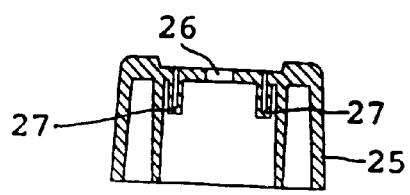
FIG. 5 is a sectional schematic view taken along line V—V of FIG. 3, showing an urging knob.
Figure 6:
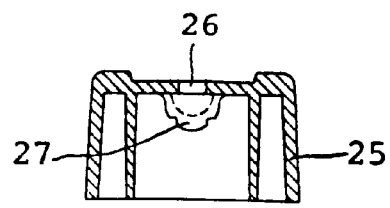
FIG. 6 is a sectional schematic view taken along line VI—VI of FIG. 3, showing the urging knob.

With reference to FIGS. 2 to 6, a preferred embodiment of a saw blade adjusting device of a band sawing machine according to the present invention comprises an urging seat 20, an urging knob 25, an adjusting knob 28, a sliding seat 40, and a wheel frame 50. The urging seat 20 is a substantially hollow and cylindrical structure, and has a top end and a bottom end. The top end of the urging seat 20 has a substantially annular peripheral portion that is provided with opposed symmetrical projections 22 and opposed symmetrical depressions 23. The bottom end of the urging seat 20 is provided with a cavity for receiving a spring 32. The urging seat 20 further has an axial hole 21 at the center for receiving an adjusting rod 30, and a polygonal body provided with opposed surfaces 24 adapted to be inserted slidably into an elongated hole 11 at the center of a top housing plate 10 of the band sawing machine such that the urging seat 20 may be subjected to the elastic action of the spring 32 to slide upwardly and downwardly within the elongated hole 11. The spring 32 is further fitted onto the adjusting rod 30, and has a bottom edge provided with a packing ring 33 such that it urges against a support frame 12 on the inner side of the band sawing machine. The support frame 12 is provided with a slot 13 for passage of the adjusting rod 30.

Figure 7:
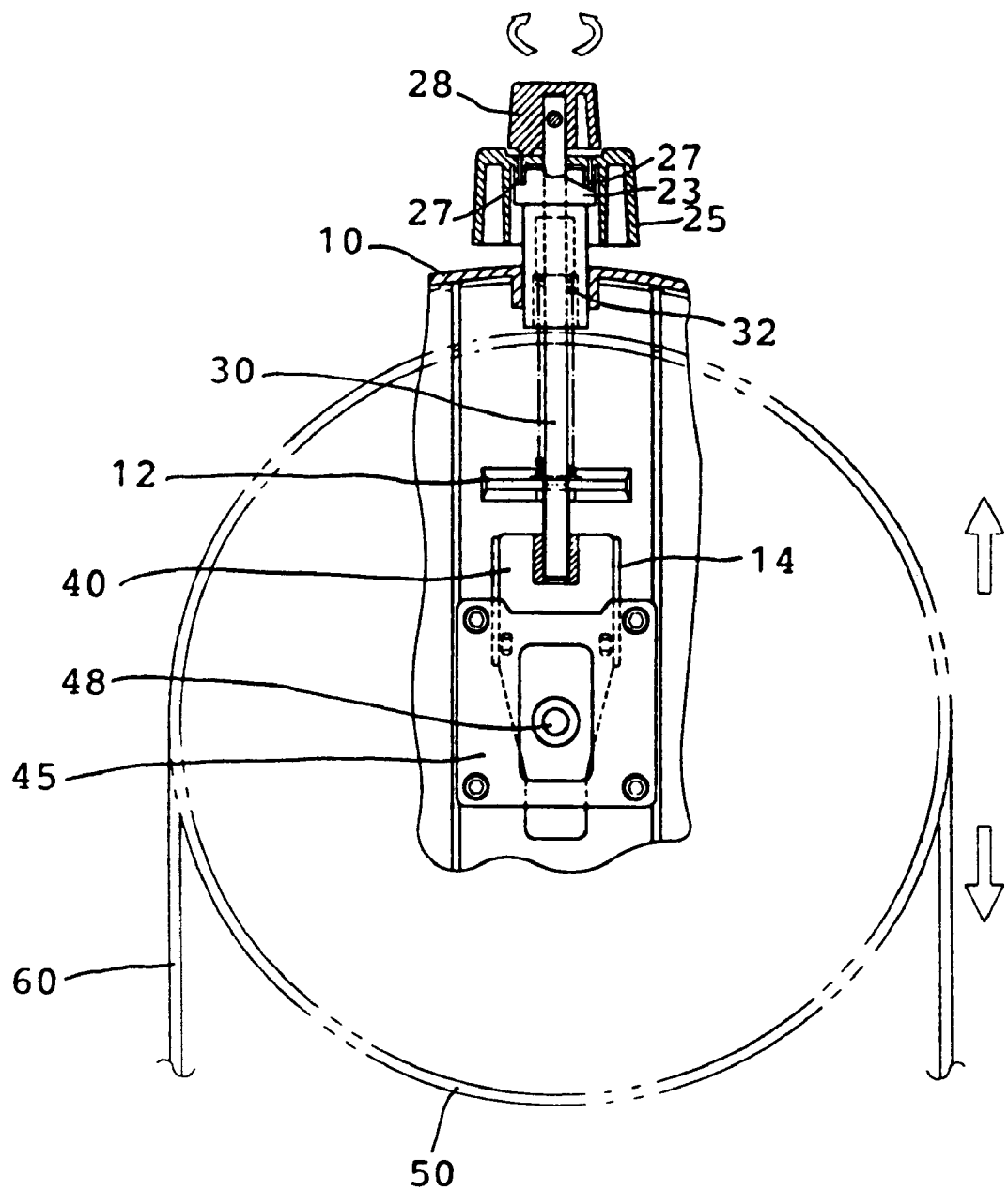
FIG. 7 is a schematic view illustrating operation of the preferred embodiment.
Figure 8:
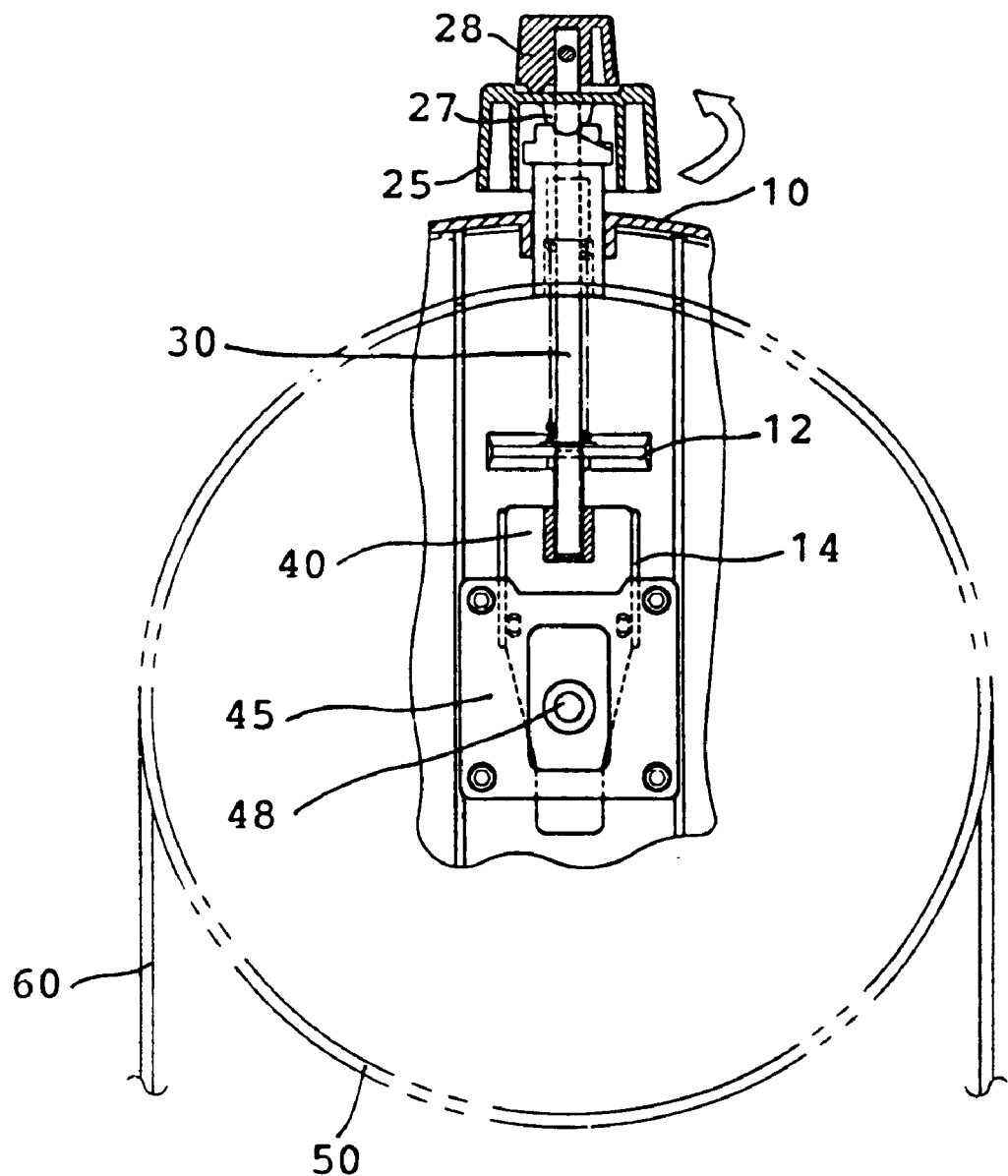
FIG. 8 is another schematic view illustrating operation of the preferred embodiment.

The urging knob 25 is centrally provided with an axial hole 26 for passage of the adjusting rod 30, and has an inner top end provided with two symmetrical and opposed urging portions 27 that project downwardly therefrom. The urging portions 27 turn with the rotation of the urging knob 25 such that they can slidably displace between the projections 22 and depressions 23 on the top end of the urging seat 20 in a smooth manner (as shown in FIGS. 7 and 8). Therefore, by turning the urging knob 25 to translate the rotation thereof to an axial reciprocating urging motion, abutment or separation of the urging knob 25 with respect to the urging seat 20 can be achieved.

The adjusting knob 28 is secured in a round hole 31 at a top end of the adjusting rod 30 by means of a securing bolt 29 to thereby constitute a linking-up structure. The adjusting knob 28 is freely turnable on the top end of the urging knob 25, and the degree of tightness of the turning thereof is influenced by the relative abutment and separation of the urging knob 25 and the urging seat 20. In addition, a bottom end of the adjusting rod 30 is connected screwably to the sliding seat 40. By means of the rotation of the adjusting rod 30, the upward and downward displacement of the sliding seat 40 can be adjusted.

The sliding seat 40 is a substantially rectangular plate structure and is disposed in a vertical track defined by two stop plates 14 of the band sawing machine. There is further provided a securing plate 45 that is secured screwably to outer ends of the stop plates 14 so that the sliding seat 40 can displace vertically in a smooth fashion to achieve adjustment, without wavering from side to side and slipping. The sliding seat 40 further has an axial hole on a top edge thereof. The axial hole 41 of the sliding seat 40 is connected screwably to a threaded end at the bottom end of the adjusting rod 30. The sliding seat 40 further has a projecting post 42 that extends from one side thereof, and that extends through an elongated hole 46 in the securing plate 45. The projecting post 42 on the sliding seat 40 is screwably secured to one end of a wheel axle 48 integrally so that the wheel axle 48 can displace upwardly and downwardly with the sliding seat 40.

The wheel frame 50 includes a retaining ring 51 that fastens the wheel frame 50 to the other end of the wheel axle 48 as a whole, so that the wheel frame 50 can follow the wheel axle 48 to displace upwardly and downwardly to achieve adjustment, further permitting adjustment of the distance between the wheel frame 50 and another wheel frame (not shown). Hence, the tautness or the tension of an annular saw blade 60 winding around the periphery of the wheel frame 50 can be suitably adjusted to facilitate subsequent sawing operations so as to enhance sawing quality and efficiency.

Operation of the present invention is illustrated in FIGS. 7 and 8. If the user wishes to replace an old saw blade with a new one, the adjusting knob 28 is firstly pressed downwardly so that the adjusting rod 30, the sliding seat 40, and the wheel axle 48 move vertically downwardly synchronously to allow easy replacement of the saw blade 60 surrounding the periphery of the wheel frame 50. And when the user wishes to adjust the tautness or tension of the saw blade 60, the urging knob 25 is firstly loosened (see FIG. 7) so that the urging portions 27 at the bottom side of the top end of the urging knob 25 may displace slidably and be positioned on the depressions 23 on the end surface of the urging seat 20. It can therefore be appreciated that, in the present invention, the axial distance between the urging knob 25 and the urging seat 20 may be changed to cause the urging knob 25 and the urging seat 20 to be in a non-taut state, and the adjusting knob 28 can be turned easily to rotate the adjusting rod 30 synchronously so as to further cause the sliding seat 40 and the wheel axle 48 to displace vertically up and down in a synchronous manner, thereby allowing adjustment of the vertical displacement of the wheel frame 50 to achieve proper adjustment of the tautness or tension of the saw blade 60 surrounding the periphery of the wheel frame 50. Furthermore, by tightening the urging knob 25, the user can cause the urging portions 27 of the urging knob 25 to displace slidably and be positioned on the projections 22 at the end surface of the urging seat 20 (see FIG. 8). In the present invention, by translating the rotary adjusting motion of the urging knob 25 into an axial reciprocating motion, the urging action between the urging knob 25 and the urging seat 20 can be achieved. Hence, in the present invention, the saw blade 60 can be urged in position. Besides, during violent cutting operation, the distance between upper and lower wheel frames and the tension of the saw blade 60 can be maintained in a stable manner, thereby enhancing the quality and efficiency of the cutting operation.

In summary, the saw blade adjusting device of a band sawing machine according to the present invention utilizes the arrangement of projections and depressions on the top end of the urging seat and of symmetrical urging portions projecting from the bottom side of the top end of the urging knob to translate the rotary adjusting motion of the urging knob into an axial urging reciprocating motion to allow convenient replacement and adjustment of the saw blade, and to effectively maintain the distance between the upper and lower frame wheels and the tension of the saw blade.

Although the present invention has been illustrated and described with reference to the preferred embodiment thereof, it should be understood that it is in no way limited to the details of such embodiment but is capable of numerous modifications within the scope of the appended claims.

What is claimed is:

1. A band sawing machine with saw blade tension adjustment comprising:

a housing plate;

a support plate being attached to said housing plate and having a slot therein;

two stop plates being attached to said housing plate and under said support frame, said stop plates being opposite to each other to form a track;

a sliding seat being substantially rectangular, being provided with an axial threaded hole at an edge thereof and a projecting post positioned below said axial threaded hole, and being disposed in said track;

a securing plate being fastened to said stop plates by screws, and elongated hole being provided therein through which said projecting post on the slide seat extends;

an adjusting rod with a first and a second end, said first end being provided with a round hole, said second end being a threaded end, wherein said adjusting rod passes through an elongated hole in the housing plate and further passes through said slot in the support frame, said threaded end engaging with said axial threaded hole on the sliding seat;

a substantially cylindrical urging seat with a third and a fourth end, said third end having an annular peripheral portion with a plurality of projections thereon spaced therebetween by a plurality of depressions, a cavity extending from said fourth end inwardly, and an axial hole extending from said third end inwardly and communicating with said cavity, said adjusting rod extending through said axial hole and said cavity;

a spring being received in said cavity in the urging seat around said adjusting rod, and being biased against said support frame;

an urging knob with two urging portions, a substantially closed end, and an open end, said urging portions extending inwardly from said substantially closed end and disposed oppositely and symmetrically with respect to each other and in slidable contact with said urging seat to slide between said projections and said depressions on the urging seat, said substantially closed end being provided with an axial hole such that said adjusting rod extends through said open end of said axial hole and out of said urging knob;

an adjusting knob being turnably located at said substantially closed end of the urging knob and receiving said first end of the adjusting rod, and being engaged with said adjusting rod by way of a bolt passing through said adjusting knob and said round hole of said first end of the adjusting rod;

a wheel axle with two ends, one of said ends being a threaded end engaging with said projecting post of the sliding seat;

a wheel frame being fitted with the other one of said ends of the wheel axle and being retained on said wheel axle by a retaining ring; and an annular saw blade surrounding said wheel frame, whereby the urging knob and the adjusting knob are operable to adjust tension of the annular saw blade.

* * * * *